US011082905B2

(12) United States Patent
Tang

(10) Patent No.: US 11,082,905 B2
(45) Date of Patent: Aug. 3, 2021

(54) METHOD FOR PROCESSING RADIO LINK FAILURE, AND TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 109 days.

(21) Appl. No.: 16/620,369

(22) PCT Filed: Jul. 24, 2017

(86) PCT No.: PCT/CN2017/094148
§ 371 (c)(1),
(2) Date: Dec. 6, 2019

(87) PCT Pub. No.: WO2019/018987
PCT Pub. Date: Jan. 31, 2019

(65) Prior Publication Data
US 2021/0007035 A1 Jan. 7, 2021

(51) Int. Cl.
*H04W 36/30* (2009.01)
*H04W 76/19* (2018.01)
*H04W 24/08* (2009.01)

(52) U.S. Cl.
CPC ......... *H04W 36/305* (2018.08); *H04W 24/08* (2013.01); *H04W 76/19* (2018.02)

(58) Field of Classification Search
CPC ... H04W 36/305; H04W 76/19; H04W 24/08; H04W 36/08; H04W 76/34; H04W 36/04; H04W 76/18; H04W 28/04; H04W 76/28
See application file for complete search history.

(56) References Cited

U.S. PATENT DOCUMENTS

| 2014/0050102 A1* | 2/2014 | Lee ...................... H04W 76/19 370/242 |
| 2016/0037579 A1* | 2/2016 | Jung ..................... H04W 76/34 370/252 |

(Continued)

FOREIGN PATENT DOCUMENTS

| CN | 102083097 | 6/2011 |
| CN | 102104892 | 6/2011 |

(Continued)

OTHER PUBLICATIONS

LG Electronics Inc., "Reaching maximum number of RLC retransmission with PDCP," 3GPP TSG-RAN WG2 NR Ad Hoc #2, R2-1707340, Jun. 2017, 2 pages.

(Continued)

*Primary Examiner* — Ayaz R Sheikh
*Assistant Examiner* — Louis Samara
(74) *Attorney, Agent, or Firm* — Hodgson Russ LLP

(57) ABSTRACT

Embodiments of the present application relate to a method for processing a radio link failure, and a terminal device and a network device. The method includes: sending, by a terminal device, same PDCP layer data to a network device using a primary carrier and a secondary carrier; if the number of transmissions of AMD PDU reaches the maximum number of transmissions in an RLC entity corresponding to the secondary carrier, determining by the terminal device that an RLF event occurs in the secondary carrier; and sending, by the terminal device, first RLF type indication information to the network device, wherein the first RLF type indication information is used to indicate that a carrier where the RLF event occurs is the secondary carrier.

20 Claims, 4 Drawing Sheets

(56) References Cited

U.S. PATENT DOCUMENTS

| | | | | |
|---|---|---|---|---|
| 2016/0192269 A1* | 6/2016 | Kim | .................. | H04W 36/04 |
| | | | | 370/332 |
| 2016/0338134 A1* | 11/2016 | Nagasaka | ............. | H04W 36/08 |
| 2018/0270792 A1* | 9/2018 | Park | .................. | H04W 76/28 |
| 2018/0279168 A1* | 9/2018 | Jheng | .................. | H04W 28/04 |
| 2018/0310202 A1* | 10/2018 | Lohr | .................. | H04W 76/19 |
| 2019/0082363 A1* | 3/2019 | Park | .................. | H04W 76/18 |

FOREIGN PATENT DOCUMENTS

| | | |
|---|---|---|
| CN | 102223730 | 10/2011 |
| CN | 103190169 | 7/2013 |
| CN | 103581941 | 2/2014 |
| CN | 105282767 | 1/2016 |
| CN | 105960772 | 9/2016 |
| EP | 3101992 | 12/2016 |
| EP | 3270622 | 1/2018 |
| WO | 2016163432 | 10/2016 |

OTHER PUBLICATIONS

SIPO, Second Office Action for CN Application No. 201780088978.X, dated Sep. 8, 2020.
EPO, Office Action for EP Application No. 17919008.7, dated Jun. 19, 2020.
SIPO, First Office Action for CN Application No. 201780088978.X, dated Jun. 3, 2020.
IPI, Office Action for IN Application No. 201917054435, dated Feb. 16, 2021.
WIPO, ISR for PCT/CN2017/094148, Mar. 30, 2018.
Blackberry, "Test sequence for Dual Connectivity test case 8.5.1.8.2, Radio link failure on PSCell / UE supports Split DRB," 3GPP TSG RAN WG5 Meeting #72, R5-165475r1, Aug. 2016, 5 pages.
Qualcomm Incorporated, "Support of RLC UM for LWA and Dual Connectivity split bearer," 3GPP TSG-RAN2 Meeting #98, R2-1705744, May 2017, 5 pages.
EPO, Office Action for EP Application No. 17919008.7, dated Dec. 10, 2019.

\* cited by examiner

METHOD FOR PROCESSING RADIO LINK FAILURE, AND TERMINAL DEVICE AND NETWORK DEVICE

CROSS-REFERENCE TO RELATED APPLICATION

This application is a U.S. national phase application of International Application No. PCT/CN2017/094148, filed Jul. 24, 2017, the entire disclosure of which is incorporated herein by reference.

TECHNICAL FIELD

Embodiments of the present disclosure generally relate to communication technologies, and more particularly, to a method for processing a radio link failure, a terminal device and a network device.

BACKGROUND

In a Long Term Evolution (LTE) system, when a Radio Link Control (RLC) entity is in an Acknowledged Mode (AM), if the number of transmissions of AM Protocol Data Unit (AMD PDU) reaches the maximum number of Automatic Repeat Request (ARQ) retransmissions, a Radio Link Failure (RLF) event is triggered, and the RLC entity reports the event to a network device.

In LTE, if the number of transmissions of the AMD PDU reaches the maximum number of retransmissions in the RLC entity in any one of the Primary Cell Group (MCG) and the Secondary Cell Group (SCG), the RLF event is triggered.

In the New Radio (NR), for the duplicate data transmission in the carrier aggregation (CA) scenario, the packet data convergence protocol layer transmits the generated duplicate data (i.e., the PDCP PDU and the duplicate PDCP PDU) to two RLC entities, respectively. The two RLC entities are mapped to different physical layer carriers, such as the primary carrier (PCELL) and the secondary carrier (SCELL). According to the existing RLF event trigger scheme in LTE, when the terminal device reports the RLF event to the network device, the terminal device only reports the trigger of the RLF event. However, in the CA scenario in NR, if the number of transmissions in the RLC entity reaches the maximum number of retransmissions, how to report needs to be reconsidered.

SUMMARY

Embodiments of the present disclosure provide a method for processing an RLF, a terminal device and a network device, which are capable of processing RLF events in different types of carriers.

In a first aspect, there is provided a method for processing a Radio Link Failure (RLF), including:

sending, by a terminal device, same Packet Data Convergence Protocol (PDCP) layer data to a network device using a primary carrier and a secondary carrier;

if the number of transmissions of Acknowledged Mode Protocol Data Unit (AMD PDU) reaches the maximum number of transmissions in a Radio Link Control (RLC) entity corresponding to the secondary carrier, determining by the terminal device that an RLF event occurs in the secondary carrier; and sending, by the terminal device, first RLF type indication information to the network device, wherein the first RLF type indication information is used to indicate that a carrier where the RLF event occurs is the secondary carrier.

In the method for processing an RLF according to embodiments of the present disclosure, the terminal device and the network device transmit the same PDCP layer data through the primary carrier and the secondary carrier; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

In connection with the first aspect, according to a possible implementation in the first aspect, sending, by the terminal device, first RLF type indication information to the network device, comprises:

sending, by the terminal device, Secondary Cell Group (SCG) failure information to the network device, wherein the SCG failure information comprises the first RLF type indication information.

In connection with the first aspect and the above implementation, according to another possible implementation in the first aspect, the primary carrier is a primary carrier in a Master Cell Group (MCG), and the secondary carrier is a secondary carrier in the MCG.

In connection with the first aspect and the above implementations, according to another possible implementation in the first aspect, the primary carrier is a primary carrier in a Secondary Cell Group (SCG), and the secondary carrier is a secondary carrier in the SCG.

In connection with the first aspect and the above implementations, according to another possible implementation in the first aspect, the secondary carrier is a secondary carrier in the MCG, and the first RLF type indication information is used to indicate that the carrier where the RLF event occurs is a secondary carrier in the MCG.

In connection with the first aspect and the above implementations, according to another possible implementation in the first aspect, the secondary carrier is a secondary carrier in the SCG, and the first RLF type indication information is used to indicate that the carrier where the RLF event occurs is a secondary carrier in the SCG.

In connection with the first aspect and the above implementations, according to another possible implementation in the first aspect, the primary carrier is a primary carrier in the SCG, and the secondary carrier is a secondary carrier in the SCG. The method further comprises:

if the number of transmissions of the AMD PDU reaches the maximum number of transmissions in the RLC entity corresponding to the primary carrier in the SCG, determining by the terminal device that the RLF event occurs in the primary carrier in the SCG; and sending, by the terminal device, second RLF type indication information to the network device, wherein the second RLF type indication information is used to indicate that the carrier where the RLF event occurs is the primary carrier in the SCG.

In connection with the first aspect and the above implementations, according to another possible implementation in the first aspect, the method further includes:

if it is determined that the number of transmissions of the AMD PDU reaches the maximum number of transmissions in the RLC entity corresponding to a target carrier, determining by the terminal device that the RLF event occurs in the target carrier, and sending Radio Resource Control (RRC) reconfiguration information to the network device, wherein the RRC reconfiguration information is used to perform RRC connection reconfiguration between the terminal device and the network device, and the target carrier is a secondary carrier in the MCG, a primary carrier in the SCG or a secondary carrier in the SCG.

In connection with the first aspect and the above implementations, according to another possible implementation in the first aspect, the method further includes:

if it is determined by the terminal device that the number of transmissions of the AMD PDU reaches the maximum number of transmissions in the RLC entity corresponding to the primary carrier in the MCG, determining by the terminal device that the RLF event occurs in the primary carrier in the MCG, and sending an RRC re-establishment request message to the network device, wherein the RRC re-establishment request message is configured to request RRC re-establishment with the network device.

In view of the above, in the method for processing an RLF according to embodiments of the present disclosure, the terminal device and the network device transmit the same PDCP layer data through the primary carrier and the secondary carrier; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

In a second aspect, there is provided a method for processing a Radio Link Failure (RLF), comprising:

receiving, by a network device, same Packet Data Convergence Protocol (PDCP) layer data which is sent by a terminal device using a primary carrier and a secondary carrier;

receiving, by the network device, first RLF type indication information sent by the terminal device, wherein the first RLF type indication information is used to indicate that a carrier where an RLF event occurs is the secondary carrier, and the number of transmissions of Acknowledged Mode Protocol Data Unit (AMD PDU) reaches the maximum number of transmissions in a Radio Link Control (RLC) entity corresponding to the secondary carrier where the RLF event occurs; and determining, by the network device, that the carrier where the RLF event occurs is the secondary carrier according to the first RLF type indication information.

In the method for processing an RLF according to embodiments of the present disclosure, the network device transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

In connection with the second aspect, according to a possible implementation in the second aspect, receiving, by the network device, first RLF type indication information sent by the terminal device, comprises:

receiving, by the network device, Secondary Cell Group (SCG) failure information sent by the terminal device, wherein the SCG failure information comprises the first RLF type indication information.

In connection with the second aspect and the above implementations, according to another possible implementation in the second aspect, the primary carrier is a primary carrier in a Master Cell Group (MCG), and the secondary carrier is a secondary carrier in the MCG.

In connection with the second aspect and the above implementations, according to another possible implementation in the second aspect, the primary carrier is a primary carrier in a Secondary Cell Group (SCG), and the secondary carrier is a secondary carrier in the SCG.

In connection with the second aspect and the above implementations, according to another possible implementation in the second aspect, the secondary carrier is a secondary carrier in the MCG, and the first RLF type indication information is used to indicate that the carrier where the RLF event occurs is a secondary carrier in the MCG.

In connection with the second aspect and the above implementations, according to another possible implementation in the second aspect, the secondary carrier is a secondary carrier in the SCG, and the first RLF type indication information is used to indicate that the carrier where the RLF event occurs is a secondary carrier in the SCG.

In connection with the second aspect and the above implementations, according to another possible implementation in the second aspect, the primary carrier is a primary carrier in the SCG, and the secondary carrier is a secondary carrier in the SCG, and the method further comprises:

receiving, by the network device, second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs; and determining, by the network device, that the carrier where the RLF event occurs is the primary carrier in the SCG according to the second RLF type indication information.

In connection with the second aspect and the above implementations, according to another possible implementation in the second aspect, the method further includes:

determining, by the network device, that the RLF event occurs in a target carrier, and sending Radio Resource Control (RRC) reconfiguration information to the terminal device, wherein the RRC reconfiguration information is used to perform RRC connection reconfiguration between the terminal device and the network device, and the target carrier is a secondary carrier in the MCG, a primary carrier in the SCG or a secondary carrier in the SCG.

In connection with the second aspect and the above implementations, according to another possible implementation in the second aspect, the method further includes:

determining, by the network device, that the RLF event occurs in the primary carrier in the MCG, and sending RRC re-establishment information to the terminal device, wherein the RRC re-establishment information is configured to perform RRC re-establishment between the terminal device and the network device.

In view of the above, in the method for processing an RLF according to embodiments of the present disclosure, the network device transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

In a third aspect, there is provided a terminal device. The terminal device is configured to perform the methods of the first aspect or any exemplary implementation manner of the first aspect described above. In particular, the terminal device includes units for performing the methods of the first aspect or any exemplary implementation manner of the first aspect described above.

In a fourth aspect, there is provided a network device. The network device is configured to perform the methods of the second aspect or any exemplary implementation manner of the second aspect described above. In particular, the network device includes units for performing the methods of the second aspect or any exemplary implementation manner of the second aspect described above.

In a fifth aspect, there is provided a terminal device, including: a storage unit and a processor. The storage unit stores instructions, and the processor is configured to execute the instructions stored in the memory; when the processor executes the instructions in the memory, the processor is caused to perform the methods of the first aspect or any exemplary implementation manner of the first aspect described above.

In a sixth aspect, there is provided a network device, including: a storage unit and a processor. The storage unit stores instructions, and the processor is configured to execute the instructions stored in the memory; when the processor executes the instructions in the memory, the processor is caused to perform the methods of the second aspect or any exemplary implementation manner of the second aspect described above.

In a seventh aspect, there is provided a computer-readable medium for storing computer programs including instructions configured to perform the methods of the first aspect or any exemplary implementation manner of the first aspect described above.

In an eighth aspect, there is provided a computer-readable medium for storing computer programs including instructions configured to perform the methods of the second aspect or any exemplary implementation manner of the second aspect described above.

In a ninth aspect, a computer program product is provided, wherein when the computer program product runs on a computer, the computer is caused to perform the methods for processing a RLF of the first aspect or any exemplary implementation manner of the first aspect described above Specifically, the computer program product can run on the terminal device in the third aspect.

In a tenth aspect, a computer program product is provided, wherein when the computer program product runs on a computer, the computer is caused to perform the methods for processing a RLF of the second aspect or any exemplary implementation manner of the second aspect described above Specifically, the computer program product can run on the network device in the fourth aspect.

DETAILED DESCRIPTION

The technical solutions in the embodiments of the present disclosure will be described below with reference to the accompanying drawings.

It should be understood that the technical solutions in the embodiments of the present disclosure may be applied to various communication systems, such as an LTE system, an LTE frequency division duplex (FDD) system, an LTE time division duplex (TDD) system, a 4.5th generation (4.5G) network, a fifth generation 5G) network, new radio (NR), etc.

The terminal device in embodiments of the present disclosure may also be referred to as a terminal, a user equipment (UE), a mobile station (MS), a mobile terminal (MT), and the like. The terminal device can be a mobile phone, a pad, a computer with wireless transceiver function, a virtual reality (VR) terminal device, an augmented reality (AR) terminal device, or a wireless terminal in industrial control, a wireless terminal in self driving, wireless terminal in self driving, a wireless terminal in remote medical surgery, a wireless terminal in smart grid, a wireless terminal in transport safety, a wireless terminal in a smart city, a wireless terminal in a smart home, and the like.

The network device involved in the embodiments of the present disclosure is a device deployed in a radio access network to provide a wireless communication function for a terminal device. The network device may be a base station, and the base station may include various forms of macro base stations, micro base stations, relay stations, access points, and the like. In systems with different radio access technologies, the names of devices with base station functionality may vary. For example, in LTE networks, the base station is called an evolved Node B (eNB or eNodeB); in the third generation (3G) networks, the base station is called as a Node B.

The base station and terminal device can be deployed on land, for example, indoors or outdoors, hand-held or on-board. The base station and terminal equipment can also be deployed on the water, on airborne aircraft, balloons and satellites. The application scenarios of the base station and the terminal device are not limited in the embodiments of the present disclosure.

Figure 1:
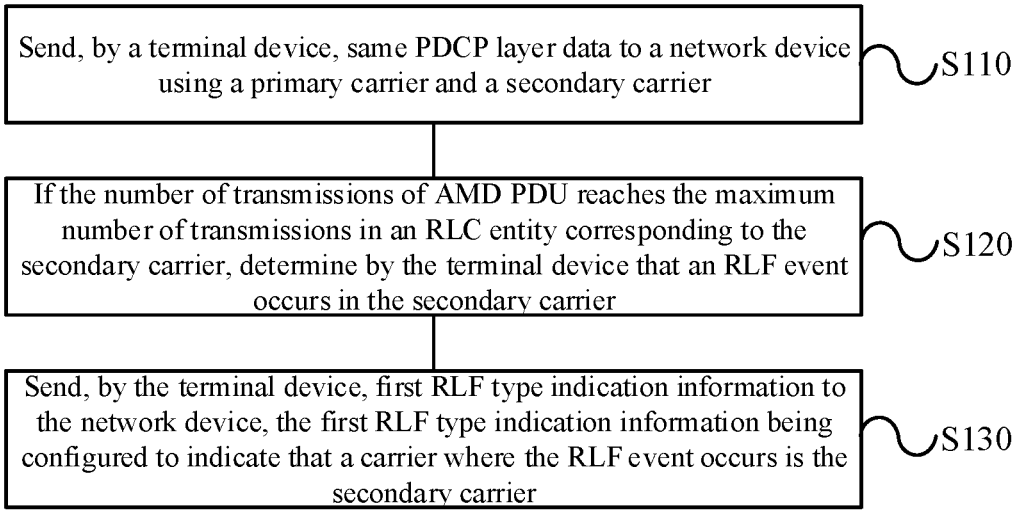
FIG. 1 is a schematic flowchart of a method for processing an RLF according to an embodiment of the present disclosure.

FIG. 1 shows a schematic flow diagram of a method 100 for processing an RLF according to an embodiment of the present disclosure. The method 100 can be performed by a terminal device.

As shown in FIG. 1, the method 100 includes the following contents:

In S110, the terminal device sends same Packet Data Convergence Protocol (PDCP) layer data to a network device using a primary carrier and a secondary carrier.

It should be understood that the embodiment of the present disclosure may be used for the duplicated transmission in the CA scenario, and the primary carrier and the secondary carrier by which the terminal device transmits the same PDCP layer data may respectively refer to one or multiple carriers. For example, the primary carrier may be one carrier, or the primary carrier may include a carrier group including a plurality of carriers. The secondary carrier may be one carrier, or the secondary carrier may include a carrier group including a plurality of carriers.

Figure 2:
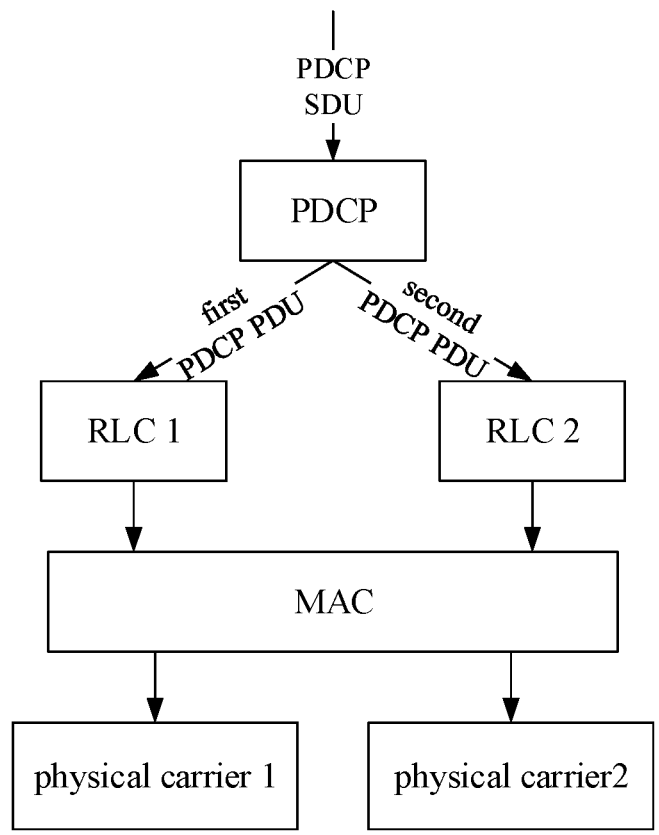
FIG. 2 is a schematic diagram of copying and transmitting PDCP layer data according to an embodiment of the present disclosure.

In embodiments of the present disclosure, the same PDCP layer data transmitted in S110 refers to repeatedly transmitting PDCP layer data packets. Specifically, FIG. 2 shows a schematic diagram of copying and transmitting PDCP layer data according to an embodiment of the present disclosure. As shown in FIG. 2, one PDCP entity is associated with two RLC entities. The terminal device performs duplication of the first PDCP PDU which is to be sent, so as to obtain a second PDCP PDU. The terminal device delivers the first PDCP PDU to one of the two RLC entities, i.e., RLC 1, and delivers the second PDCP PDU to the other RLC entity of the two RLC entities, i.e., RLC 2. The two RLC entities respectively process the received PDCP PDU, and send the first PDCP PDU and the second PDCP PDU to the network device by using two different carriers, for example, as shown in FIG. 2, by using carrier 1 and carrier 2. In an example, carrier 1 is a primary carrier, and carrier 2 is a secondary carrier. The procedure of processing the received PDCP PDU by the two RLC entities is the same as the processing of the PDCP PDU by a single RLC entity when the duplicated transmission is not performed in the prior art, and detailed descriptions are omitted here.

According to an exemplary embodiment, the terminal device may transmit the PDCP layer data by using more than two carriers. For example, the terminal device may send the same data packet to the network device by using M carriers, where M is a positive integer greater than or equal to 3. In this case, the terminal device may copy the PDCP PDU to be sent, and obtain M data packets including the PDCP PDU to be sent, and send the M identical data packets to the network through the M carriers, respectively. In this way, the reliability of data transmission can be improved. The manner in which the terminal device processes the RLF in the case where the same data packet is transmitted to the network device through the M carriers is similar to the manner in which the terminal device processes the RLF in the case where the same data packet is transmitted to the network device through the two carriers. In other words, the primary carrier may be any one of the M carriers, and the secondary carrier may be any one of the M carriers.

It should be understood that the terminal device is configured to perform the retransmission function. The RLC entity may be configured by the network device through RRC signaling. For example, the network device may configure that the terminal device may use five RLC entities for duplicated transmission, and two of the five RLC entities are in an active state, and the terminal device may use the two RLC entities for duplicated transmission.

In the case of repeatedly transmitting the PDCP PDU layer data packet, the terminal device copies the first PDCP PDU to be transmitted to obtain the second PDCP PDU. The terminal device sends the first PDCP PDU and the second PDCP PDU to two RLC entities, and each RLC entity processes the received PDCP PDU and sends the PDCP PDU to the MAC entity. The MAC entity processes the data packets sent by the two RLC layers separately, and sends the two RLC layer data packets to the network device through two different carriers. The procedure of processing the RLC layer data packet by the MAC layer entity is the same as the manner in which the MAC entity processes the RLC layer data packet when the duplicated transmission is not performed, and detailed descriptions are omitted here.

It should be understood that the duplicated transmission in the duplicated transmission data packet or the data packet duplicated transmission function in the embodiments of the present disclosure refers to copying one data packet to obtain two or more identical data packets, and transmitting the two or more identical data packets using different carriers, respectively. The duplicated transmission referred to in the embodiments of the present disclosure does not refer to packet retransmission in a mechanism such as an automatic retransmission request.

In some other exemplary embodiments, such as a dual connectivity scenario, the carrier may refer to a link with a different network device. For example, the primary carrier may be a primary carrier in the MCG, and the secondary carrier may be a secondary carrier in the MCG. Alternatively, the primary carrier may be a primary carrier in the SCG, and the secondary carrier may be a secondary carrier in the SCG. Embodiments of the present disclosure do not impose specific limitations on this.

The method 100 further includes the following contents:

In S120, if the number of transmissions of AMD PDU reaches the maximum number of transmissions in an RLC entity corresponding to the secondary carrier, the terminal device determines that an RLF event occurs in the secondary carrier.

In S130, the terminal device sends first RLF type indication information to the network device. The first RLF type indication information is used to indicate that a carrier where the RLF event occurs is the secondary carrier It should be understood that, for the dual connectivity scenario, the secondary carrier may be a secondary carrier in the MCG, or may also be a secondary carrier in the SCG. Determining, by the terminal device, that the RLF event occurs in the secondary carrier includes determining whether the RLF event occurs in the secondary carrier in the MCG, or the RLF event occurs in the secondary carrier in the SCG. Correspondingly, the first RLF indication information sent by the terminal device to the network device is used to indicate that the carrier where the RLF event occurs is a secondary carrier in the MCG or a secondary carrier in the SCG.

Similarly, the method 100 may further include: if the number of transmissions of the AMD PDU reaches the maximum number of transmissions in the RLC entity corresponding to the primary carrier, determining by the terminal device that the RLF event occurs in the primary carrier.

Similarly, for the dual connectivity scenario, the primary carrier may be a primary carrier in the MCG, or may be a primary carrier in the SCG. Determining by the terminal device that the RLF event occurs in the primary carrier may specifically include determining whether the RLF event occurs in the primary carrier in the MCG or the RLF event occurs in the primary carrier in the SCG.

Specifically, when the carrier where the RLF event occurs is the primary carrier in the MCG, the occurrence of the RLF event may be similar to the occurrence of the RLF event in the carrier in the MCG in existing technologies. The terminal device may send an RRC re-establishment request message to the network device. The RRC re-establishment request message is used to request RRC re-establishment with the network device. The network device determines that the carrier where the RLF event occurs is the primary carrier in the MCG, determines that the RRC re-establishment is performed with the terminal device according to the RRC re-establishment request message, and sends RRC re-establishment information to the terminal device for performing RRC re-establishment with the terminal device. Alternatively, the network may refuse to perform RRC re-establishment with the terminal according to the RRC re-establishment request message. The RRC re-establishment may be an RRC connection release or an RRC connection re-establishment.

It should be understood that the procedure of performing the RRC re-establishment between the network device and the terminal device if the RLF event occurs in the primary carrier in the MCG may be the same as the procedure of performing the RRC re-establishment if the RLF event occurs in the carrier in the MCG in existing technologies, and detailed descriptions are omitted here.

According to an exemplary embodiment, if the carrier where the RLF event occurs is the primary carrier in the SCG, the terminal device may send second RLF type indication information to the network device. The second RLF type indication information is used to indicate that the carrier wherein the RLF event occurs is the primary carrier in the SCG.

In summary, for a dual connectivity scenario, if an RLF event occurs, the terminal device determines the type of the target carrier in which the RLF event occurs. If the target carrier is a secondary carrier in the MCG, a primary carrier in the SCG, or a secondary carrier in the SCG, the terminal device may send the RLF type indication information to the network device. The RLF type indication information indicates to the network device that the target carrier where the RLF event occurs is a secondary carrier in the MCG, a primary carrier in the SCG, or a secondary carrier in the SCG.

Further, if the RLF event occurs on the target carrier, the terminal device may send RRC reconfiguration information to the network device. The RRC reconfiguration information is used by the terminal device to perform RRC reconfiguration with the network device. The target carrier is a secondary carrier in the MCG, a primary carrier in the SCG or a secondary carrier in the SCG. Specifically, the procedure of performing the RRC reconfiguration between the terminal device and the network device is the same as that in the existing technologies, for example, is the same as the procedure of performing the RRC reconfiguration if the RLF event occurs in the carrier in the SCG in existing technologies, and detailed descriptions are omitted here.

According to an exemplary embodiment, the RLF type indication information used to indicate the type of the carrier where the RLF event occurs may be added information, or the SCG failure information in the existing technologies may be reused. Specifically, if the RLF event occurs in the secondary carrier, or the RLF event occurs in the secondary carrier in the MCG, the primary carrier in the SCG, or the secondary carrier in the SCG, the terminal device sends the RLF type indication information to the network device. The RLF type indication information may be located in the SCG failure information. That is, according to the SCG failure procedure in the existing LTE systems, a new field may be added in the SCG failure information, and the field carries the RLF type indication information. The RLF type indication information is used to indicate that the type of the carrier where the RLF event occurs, but the embodiments of the present disclosure are not limited thereto.

In the methods for processing an RLF according to embodiments of the present disclosure, the terminal device transmits the same data through the primary carrier and the secondary carrier with the network device; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

The methods for processing an RLF according to embodiments of the present disclosure are described in detail with reference to FIG. 1 and FIG. 2 from the perspective of the terminal device. The methods for processing the RLF according to embodiments of the present disclosure will be described from the perspective of a network device.

Figure 3:
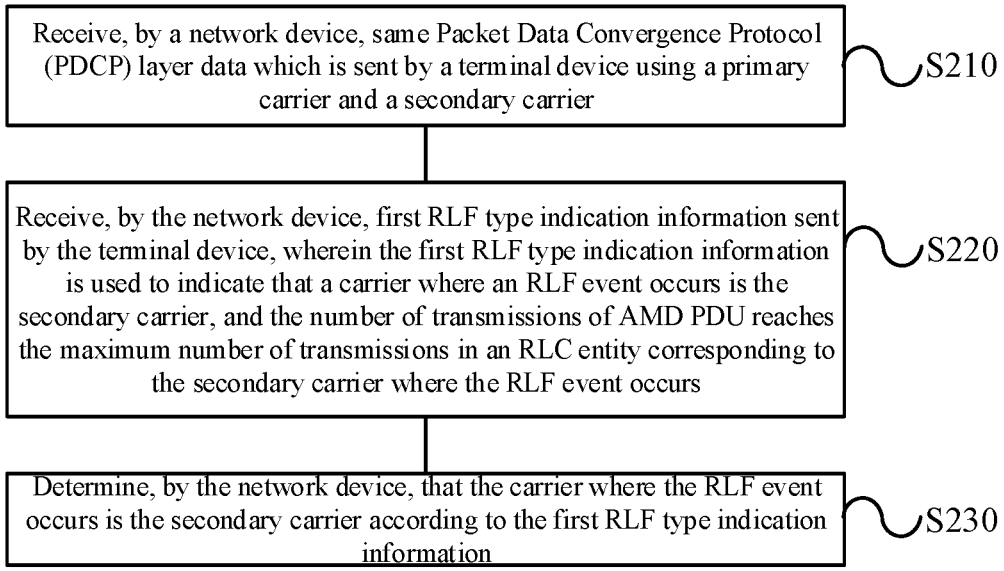
FIG. 3 is another schematic flowchart of a method for processing an RLF according to an embodiment of the present disclosure.

FIG. 3 shows a schematic flow diagram of a method 200 for processing an RLF according to an embodiment of the present disclosure. The method 200 can be performed by a network device.

As shown in FIG. 3, the method 200 includes the following contents:

In S210, the network device receives same Packet Data Convergence Protocol (PDCP) layer data which is sent by a terminal device using a primary carrier and a secondary carrier.

The method 200 further includes:

In S220, the network device receives first RLF type indication information sent by the terminal device. The first RLF type indication information is used to indicate that, a carrier where an RLF event occurs is the secondary carrier, and the number of transmissions of Acknowledged Mode Protocol Data Unit (AMD PDU) reaches the maximum number of transmissions in a Radio Link Control (RLC) entity corresponding to the secondary carrier where the RLF event occurs.

The method 200 further includes: in S230, the network device determines that the carrier where the RLF event occurs is the secondary carrier according to the first RLF type indication information.

In the method for processing an RLF according to embodiments of the present disclosure, the terminal device and the network device transmit the same PDCP layer data through the primary carrier and the secondary carrier; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

According to an exemplary embodiment, receiving, by the network device, first RLF type indication information sent by the terminal device, comprises:

receiving, by the network device, Secondary Cell Group (SCG) failure information sent by the terminal device, wherein the SCG failure information comprises the first RLF type indication information.

According to an exemplary embodiment, the primary carrier is a primary carrier in a Master Cell Group (MCG), and the secondary carrier is a secondary carrier in the MCG; or the primary carrier is a primary carrier in a Secondary Cell Group (SCG), and the secondary carrier is a secondary carrier in the SCG.

According to an exemplary embodiment, the secondary carrier is a secondary carrier in the MCG, and the first RLF type indication information is used to indicate that the carrier where the RLF event occurs is a secondary carrier in the MCG; or the secondary carrier is a secondary carrier in the SCG, and the first RLF type indication information is used to indicate that the carrier where the RLF event occurs is a secondary carrier in the SCG.

According to an exemplary embodiment, the primary carrier is a primary carrier in the SCG, and the secondary carrier is a secondary carrier in the SCG, and the method further comprises:

receiving, by the network device, second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs; and determining, by the network device, that the carrier where the RLF event occurs is the primary carrier in the SCG according to the second RLF type indication information.

According to an exemplary embodiment, the method further includes:

determining, by the network device, that the RLF event occurs in a target carrier, and sending Radio Resource Control (RRC) reconfiguration information to the terminal device, wherein the RRC reconfiguration information is used to perform RRC connection reconfiguration between the terminal device and the network device, and the target carrier is a secondary carrier in the MCG, a primary carrier in the SCG or a secondary carrier in the SCG.

According to an exemplary embodiment, the method further includes:

determining, by the network device, that the RLF event occurs in the primary carrier in the MCG, and sending RRC reestablishment information to the terminal device, wherein the RRC reestablishment information is configured to perform RRC reestablishment between the terminal device and the network device.

It should be understood that the network in the method 200 may correspond to the network device in the method 100, and the terminal device in the method 200 may correspond to the terminal device in the method 100, and repeated descriptions are omitted here.

In the methods for processing an RLF according to embodiments of the present disclosure, the terminal device transmits the same PDCP layer data with the network device through the primary carrier and the secondary carrier; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

It should also be understood that, in various embodiments of the present disclosure, the sequence numbers of the above-mentioned processes do not mean the order of execution, and the execution order of the processes should be determined by their functions and internal logics, and should not constitute any limitation on the implementation processes of the embodiments of the present disclosure.

The methods for processing an RLF according to the embodiments of the present disclosure are described in detail above with reference to FIG. 1 to FIG. 3, and the terminal device and the network device according to the embodiments of the present disclosure will be described below with reference to FIGS. 4 to 7.

Figure 4:
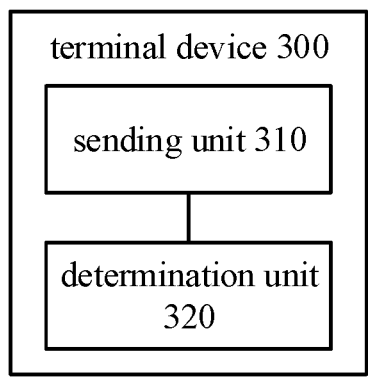
FIG. 4 is a schematic block diagram of a terminal device according to an embodiment of the present disclosure.

As shown in FIG. 4, a terminal device 300 according to an embodiment of the present disclosure includes a sending unit 310 and a determination unit 320.

The sending unit 310 is configured to send same Packet Data Convergence Protocol (PDCP) layer data to a network device using a primary carrier and a secondary carrier.

The determination unit 320 is configured to, if the number of transmissions of AMD PDU reaches the maximum number of transmissions in an RLC entity corresponding to the secondary carrier, determine that an RLF event occurs in the secondary carrier.

The sending unit 310 is configured to send first RLF type indication information to the network device. The first RLF type indication information is used to indicate that a carrier where the RLF event occurs is the secondary carrier.

The terminal device according to embodiments of the present disclosure sends the same data through the primary carrier and the secondary carrier to the network device; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

According to an exemplary embodiment, the sending unit 310 is configured to:

send SCG failure information to the network device, wherein the SCG failure information comprises the first RLF type indication information.

According to an exemplary embodiment, the primary carrier is a primary carrier in a MCG, and the secondary carrier is a secondary carrier in the MCG; or the primary carrier is a primary carrier in a SCG, and the secondary carrier is a secondary carrier in the SCG.

According to an exemplary embodiment, the secondary carrier is a secondary carrier in the MCG, and the first RLF type indication information is used to indicate that the carrier where the RLF event occurs is a secondary carrier in the MCG; or the secondary carrier is a secondary carrier in the SCG, and the first RLF type indication information is used to indicate that the carrier where the RLF event occurs is a secondary carrier in the SCG.

According to an exemplary embodiment, the primary carrier is a primary carrier in the SCG, and the secondary carrier is a secondary carrier in the SCG, and the determination unit 320 is configured to: if the number of transmissions of the AMD PDU reaches the maximum number of transmissions in the RLC entity corresponding to the primary carrier in the SCG, determine that the RLF event occurs in the primary carrier in the SCG. The sending unit 310 is configured to send second RLF type indication information to the network device, wherein the second RLF type indication information is used to indicate that the carrier where the RLF event occurs is the primary carrier in the SCG.

According to an exemplary embodiment, the determination unit 320 is further configured to: if it is determined that the number of transmissions of the AMD PDU reaches the maximum number of transmissions in the RLC entity corresponding to a target carrier, determine that the RLF event occurs in the target carrier. The sending unit 310 is configured to send RRC reconfiguration information to the network device, the RRC reconfiguration information is used to perform RRC connection reconfiguration between the terminal device and the network device, and the target carrier is a secondary carrier in the MCG, a primary carrier in the SCG or a secondary carrier in the SCG.

According to an exemplary embodiment, the determination unit 320 is configured to: if it is determined by the determination unit 320 that the number of transmissions of the AMD PDU reaches the maximum number of transmissions in the RLC entity corresponding to the primary carrier in the MCG, determine that the RLF event occurs in the primary carrier in the MCG. The sending unit 310 is configured to send an RRC reestablishment request message to the network device, and the RRC reestablishment request message is configured to request RRC reestablishment with the network device.

It should be understood that the terminal device 300 according to the embodiments of the present disclosure may be configured to perform the method 100 according to embodiments of the present disclosure, and the abovementioned and other operations and/or functions of each unit in the terminal device 300 are respectively for implementing the corresponding processes of the terminal device in the methods described with reference to FIGS. 1 to 3, and for brevity, repeated descriptions are omitted here.

The terminal device according to embodiments of the present disclosure transmits the same data through the primary carrier and the secondary carrier with the network device; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

Figure 5:
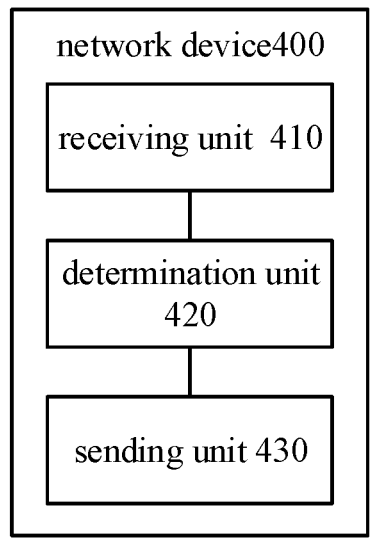
FIG. 5 is a schematic block diagram of a network device according to an embodiment of the present disclosure.

As shown in FIG. 5, a network device 400 according to an embodiment of the present disclosure includes a receiving unit 410 and a determination unit 420. According to an exemplary embodiment, the network device may further include a sending unit 430.

The receiving unit 410 is configured to receive same PDCP layer data which is sent by a terminal device using a primary carrier and a secondary carrier.

The receiving unit 410 is configured to receive first RLF type indication information sent by the terminal device. The first RLF type indication information is used to indicate that a carrier where an RLF event occurs is the secondary carrier, and the number of transmissions of AMD PDU reaches the maximum number of transmissions in an RLC entity corresponding to the secondary carrier where the RLF event occurs.

The determination unit 420 is configured to determine that the carrier where the RLF event occurs is the secondary carrier according to the first RLF type indication information.

The network device according to an embodiment of the present disclosure transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

According to an exemplary embodiment, the receiving unit 410 is configured to: receive SCG failure information sent by the terminal device, wherein the SCG failure information comprises the first RLF type indication information.

According to an exemplary embodiment, the primary carrier is a primary carrier in a MCG, and the secondary carrier is a secondary carrier in the MCG; or the primary carrier is a primary carrier in a SCG, and the secondary carrier is a secondary carrier in the SCG.

According to an exemplary embodiment, the secondary carrier is a secondary carrier in the MCG, and the first RLF type indication information is used to indicate that the carrier where the RLF event occurs is a secondary carrier in the MCG; or the secondary carrier is a secondary carrier in the SCG, and the first RLF type indication information is used to indicate that the carrier where the RLF event occurs is a secondary carrier in the SCG.

According to an exemplary embodiment, the primary carrier is a primary carrier in the SCG, and the secondary carrier is a secondary carrier in the SCG, and the receiving unit 410 is configured to:

receive second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs; and the determination unit is configured to determine that the carrier where the RLF event occurs is the primary carrier in the SCG according to the second RLF type indication information.

According to an exemplary embodiment, the sending unit 430 is configured to, if the determination unit determines that the RLF event occurs in a target carrier, send RRC reconfiguration information to the terminal device, wherein the RRC reconfiguration information is used to perform RRC connection reconfiguration between the terminal device and the network device, and the target carrier is a secondary carrier in the MCG, a primary carrier in the SCG or a secondary carrier in the SCG.

According to an exemplary embodiment, the sending unit 430 is configured to, if the determination unit determines that the RLF event occurs in the primary carrier in the MCG, send RRC reestablishment information to the terminal device, wherein the RRC reestablishment information is configured to perform RRC reestablishment between the terminal device and the network device.

It should be understood that the network device 400 according to the embodiments of the present disclosure may be configured to perform the method 200 according to embodiments of the present disclosure, and the above-mentioned and other operations and/or functions of each unit in the network device 400 are respectively for implementing the corresponding processes of the network device in the methods described with reference to FIGS. 1 to 3, and for brevity, repeated descriptions are omitted here.

The network device according to embodiments of the present disclosure transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

Figure 6:
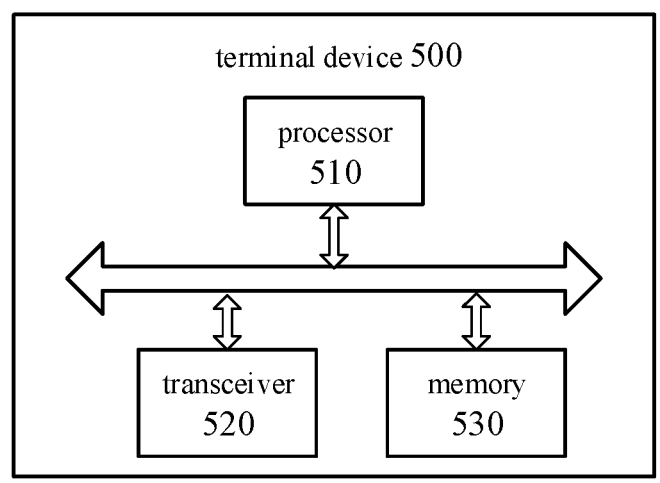
FIG. 6 is another schematic block diagram of a terminal device according to an embodiment of the present disclosure.

FIG. 6 shows a schematic block diagram of a terminal device 500 according to an embodiment of the present disclosure. As shown in FIG. 6, the terminal device 500 includes a processor 510 and a transceiver 520. The processor 510 is connected to the transceiver 520. According to an exemplary embodiment, the terminal device 500 further includes a memory 530, and the memory 530 is connected to the processor 510. The processor 510, the memory 530, and the transceiver 520 communicate with each other through an internal connection path to transmit control and/or data signals. The memory 530 can be used to store instructions. The processor 510 is configured to execute the instructions stored in the memory 530 to control the transceiver 520 to send information or signals. The transceiver 520 is configured to send same PDCP layer data to a network device using a primary carrier and a secondary carrier. The processor 510 is configured to: if the number of transmissions of AMD PDU reaches the maximum number of transmissions in an RLC entity corresponding to the secondary carrier, determine that an RLF event occurs in the secondary carrier. The transceiver 520 is configured send to first RLF type indication information to the network device. The first RLF type indication information is used to indicate that a carrier where the RLF event occurs is the secondary carrier.

The terminal device according to embodiments of the present disclosure transmit the same data through the primary carrier and the secondary carrier with the network device; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

According to an exemplary embodiment, the transceiver 520 is configured to send SCG failure information to the network device, wherein the SCG failure information comprises the first RLF type indication information.

According to an exemplary embodiment, the primary carrier is a primary carrier in a MCG, and the secondary carrier is a secondary carrier in the MCG; or the primary carrier is a primary carrier in a SCG, and the secondary carrier is a secondary carrier in the SCG.

According to an exemplary embodiment, the secondary carrier is a secondary carrier in the MCG, and the first RLF type indication information is used to indicate that the carrier where the RLF event occurs is a secondary carrier in the MCG; or the secondary carrier is a secondary carrier in the SCG, and the first RLF type indication information is used to indicate that the carrier where the RLF event occurs is a secondary carrier in the SCG.

According to an exemplary embodiment, the primary carrier is a primary carrier in the SCG, and the secondary carrier is a secondary carrier in the SCG, and the processor 510 is configured to: if the number of transmissions of the AMD PDU reaches the maximum number of transmissions in the RLC entity corresponding to the primary carrier in the SCG, determine that the RLF event occurs in the primary carrier in the SCG. The transceiver 520 is configured to send second RLF type indication information to the network device, wherein the second RLF type indication information is used to indicate that the carrier where the RLF event occurs is the primary carrier in the SCG.

According to an exemplary embodiment, the processor 510 is further configured to: if it is determined by the processor 510 that the number of transmissions of the AMD PDU reaches the maximum number of transmissions in the RLC entity corresponding to a target carrier, determine that the RLF event occurs in the target carrier. The transceiver 520 is configured to send RRC reconfiguration information to the network device, the RRC reconfiguration information is used to perform RRC connection reconfiguration between the terminal device and the network device, and the target carrier is a secondary carrier in the MCG, a primary carrier in the SCG or a secondary carrier in the SCG.

According to an exemplary embodiment, the processor 510 is configured to: if it is determined by the processor 510 that the number of transmissions of the AMD PDU reaches the maximum number of transmissions in the RLC entity corresponding to the primary carrier in the MCG, determine that the RLF event occurs in the primary carrier in the MCG. The transceiver 520 is configured to send an RRC reestablishment request message to the network device. The RRC reestablishment request message is configured to request RRC reestablishment with the network device.

It should be understood that the terminal device 500 according to the embodiments of the present disclosure may correspond to the terminal device 300 according to embodiments of the present disclosure, and may be configured to perform corresponding steps in the method 100 according to embodiments of the present disclosure. The above-mentioned and other operations and/or functions of each unit in the terminal device 500 are respectively used for implementing the corresponding processes of the terminal device in the methods described with reference to FIG. 1, and for brevity, repeated descriptions are omitted here.

The terminal device according to embodiments of the present disclosure transmits the same data through the primary carrier and the secondary carrier with the network device; if the RLF event occurs in the RLC entity corresponding to the secondary carrier, the terminal device sends the RLF type indication information to the network device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

Figure 7:
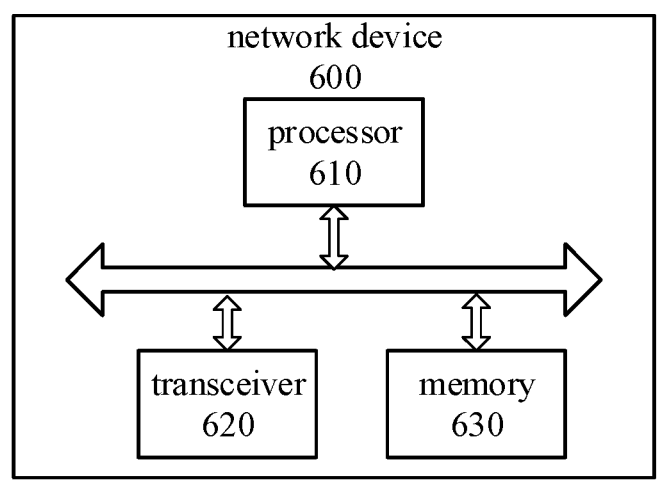
FIG. 7 is another schematic block diagram of a network device according to an embodiment of the present disclosure.

FIG. 7 shows a schematic block diagram of a network device 600 according to an embodiment of the present disclosure. As shown in FIG. 7, the network device 600 includes a processor 610 and a transceiver 620. The processor 610 is connected to the transceiver 620. According to an exemplary embodiment, the network device 600 further includes a memory 630, and the memory 630 is connected to the processor 610. The processor 610, the memory 630, and the transceiver 620 communicate with each other through an internal connection path to transmit control and/or data signals. The memory 630 can be used to store instructions. The processor 610 is configured to execute the instructions stored in the memory 630 to control the transceiver 620 to send information or signals. The transceiver 620 is configured to receive same PDCP layer data which is sent by a terminal device using a primary carrier and a secondary carrier; receive first RLF type indication information sent by the terminal device, wherein the first RLF type indication information is used to indicate that a carrier where an RLF event occurs is the secondary carrier, and the number of transmissions of AMD PDU reaches the maximum number of transmissions in an RLC entity corresponding to the secondary carrier where the RLF event occurs. The processor 610 is configured to determine that the carrier where the RLF event occurs is the secondary carrier according to the first RLF type indication information.

The network device according to an embodiment of the present disclosure transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

According to an exemplary embodiment, the transceiver 620 is configured to receive SCG failure information sent by the terminal device, wherein the SCG failure information comprises the first RLF type indication information.

According to an exemplary embodiment, the primary carrier is a primary carrier in a MCG, and the secondary carrier is a secondary carrier in the MCG; or the primary carrier is a primary carrier in a SCG, and the secondary carrier is a secondary carrier in the SCG.

According to an exemplary embodiment, the secondary carrier is a secondary carrier in the MCG, and the first RLF type indication information is used to indicate that the carrier where the RLF event occurs is a secondary carrier in the MCG; or the secondary carrier is a secondary carrier in the SCG, and the first RLF type indication information is used to indicate that the carrier where the RLF event occurs is a secondary carrier in the SCG.

According to an exemplary embodiment, the primary carrier is a primary carrier in the SCG, and the secondary carrier is a secondary carrier in the SCG, and the transceiver 620 is configured to: receive second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs. The processor 610 is configured to determine that the carrier where the RLF event occurs is the primary carrier in the SCG according to the second RLF type indication information.

According to an exemplary embodiment, the transceiver 620 is configured to, if the processor 610 determines that the RLF event occurs in a target carrier, send RRC reconfiguration information to the terminal device, wherein the RRC reconfiguration information is used to perform RRC connection reconfiguration between the terminal device and the network device, and the target carrier is a secondary carrier in the MCG, a primary carrier in the SCG or a secondary carrier in the SCG.

According to an exemplary embodiment, the transceiver 620 is configured to, if the processor 610 determines that the RLF event occurs in the primary carrier in the MCG, send RRC reestablishment information to the terminal device, wherein the RRC reestablishment information is configured to perform RRC reestablishment between the terminal device and the network device.

It should be understood that the network device 600 according to the embodiments of the present disclosure may correspond to the network device 400 according to embodiments of the present disclosure, and may be configured to perform corresponding steps in the method 100 according to embodiments of the present disclosure. The above-mentioned and other operations and/or functions of each unit in the network device 600 are respectively used for implementing the corresponding processes of the network device in the methods described with reference to FIGS. 1 to 3, and for brevity, repeated descriptions are omitted here.

The network device according to an embodiment of the present disclosure transmits the same data with the terminal device through the primary carrier and the secondary carrier; if the RLF event occurs in the RLC entity corresponding to the secondary carrier, the network device receives the RLF type indication information sent by the terminal device. The RLF type indication information may indicate the type of the carrier where the RLF event occurs, so that the network device can determine whether the carrier where the RLF event occurs is the primary carrier or the secondary carrier, and determine different processing manners according to different carrier types, thereby improving transmission efficiency.

It should be noted that the above method embodiments of the present disclosure may be applied to a processor or implemented by a processor. The processor may be an integrated circuit chip with signal processing capabilities. In practical implementation, steps of the foregoing method embodiments may be implemented by an integrated logic circuit of hardware in a processor or an instruction in a form of software. The processor may be a general-purpose processor, a digital signal processor (DSP), an application specific integrated circuit (ASIC), a Field Programmable Gate Array (FPGA), or other programmable logic devices, discrete gates or transistor logic devices, discrete hardware components, or the like. The methods, steps, and logical block diagrams disclosed in the embodiments of the present disclosure can be implemented or executed. The general purpose processor may be a microprocessor or the processor may be any conventional processor or the like. The steps of the methods disclosed in the embodiments of the present disclosure may be directly implemented by a hardware decoding processor, or may be performed by a combination of hardware and software modules in the decoding processor. The software modules can be located in a conventional storage medium such as random access memory, flash memory, read only memory, programmable read only memory or electrically erasable programmable memory, registers, and the like. The storage medium is located in the memory, and the processor reads the information in the memory and implements the steps of the above methods in corporation with the hardware.

It is to be understood that the memory in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (EPROM), or an electrically erasable programmable read only memory (EEPROM) or flash memory. The volatile memory can be a Random Access Memory (RAM) that acts as an external cache. By way of example but not limitation, many forms of RAM may be used, such as static random access memory (SRAM), dynamic random access memory (DRAM), synchronous dynamic random access memory (SDRAM), double data rate SDRAM (DDR SDRAM), enhanced synchronous dynamic random access memory (ESDRAM), synchlink dynamic random access memory (SLDRAM)) and direct ram bus random access memory (DR RAM). It should be noted that the memories involved in the systems and methods described herein are intended to comprise, without being limited to, the above mentioned and any other suitable types of memory.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that for the convenience and brevity of the description, details of specific operation procedures of the systems, devices and units can be found in the previous descriptions regarding the method embodiments, and details are not described herein again.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the methods described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for processing a Radio Link Failure (RLF), comprising:
    sending, by a terminal device, same Packet Data Convergence Protocol (PDCP) layer data to a network device using a primary carrier and a secondary carrier;
    if a number of transmissions of Acknowledged Mode Protocol Data Unit (AMD PDU) reaches a maximum number of transmissions in a Radio Link Control (RLC) entity corresponding to the secondary carrier, determining by the terminal device that a RLF event occurs in the secondary carrier; and
    sending, by the terminal device, first RLF type indication information to the network device, wherein the first RLF type indication information is used to indicate that a carrier where the RLF event occurs is the secondary carrier;
    wherein sending, by the terminal device, first RLF type indication information to the network device, comprises:
    sending, by the terminal device, Secondary Cell Group (SCG) failure information to the network device, wherein the SCG failure information comprises the first RLF type indication information;
    wherein the primary carrier is a primary carrier in a Secondary Cell Group (SCG), and the secondary carrier is a secondary carrier in the SCG.

2. The method according to claim 1,
    wherein the first RLF type indication information is used to indicate that the carrier where the RLF event occurs is a secondary carrier in the SCG.

3. The method according to claim 2, wherein the method further comprises:

if the number of transmissions of the AMD PDU reaches the maximum number of transmissions in the RLC entity corresponding to the primary carrier in the SCG, determining by the terminal device that the RLF event occurs in the primary carrier in the SCG; and sending, by the terminal device, the second RLF type indication information to the network device, wherein the second RLF type indication information is used to indicate that the carrier where the RLF event occurs is the primary carrier in the SCG.

4. The method according to claim 2, further comprising:
if it is determined that the number of transmissions of the AMD PDU reaches the maximum number of transmissions in the RLC entity corresponding to a target carrier, determining by the terminal device that the RLF event occurs in the target carrier, and sending Radio Resource Control (RRC) reconfiguration information to the network device, wherein the RRC reconfiguration information is used to perform RRC connection reconfiguration between the terminal device and the network device, and the target carrier is a secondary carrier in a Master Cell Group (MCG), a primary carrier in the SCG or a secondary carrier in the SCG.

5. The method according to claim 2, further comprising:
if it is determined by the terminal device that the number of transmissions of the AMD PDU reaches the maximum number of transmissions in the RLC entity corresponding to the primary carrier in a Master Cell Group (MCG), determining by the terminal device that the RLF event occurs in the primary carrier in the MCG, and sending an RRC re-establishment request message to the network device, wherein the RRC re-establishment request message is configured to request RRC re-establishment with the network device.

6. A method for processing a Radio Link Failure (RLF), comprising:
receiving, by a network device, same Packet Data Convergence Protocol (PDCP) layer data which is sent by a terminal device using a primary carrier and a secondary carrier;
receiving, by the network device, first RLF type indication information sent by the terminal device, wherein the first RLF type indication information is used to indicate that a carrier where an RLF event occurs is the secondary carrier, and a number of transmissions of Acknowledged Mode Protocol Data Unit (AMD PDU) reaches a maximum number of transmissions in a Radio Link Control (RLC) entity corresponding to the secondary carrier where the RLF event occurs; and
determining, by the network device, that the carrier where the RLF event occurs is the secondary carrier according to the first RLF type indication information;
wherein receiving, by the network device, first RLF type indication information sent by the terminal device, comprises:
receiving, by the network device, Secondary Cell Group (SCG) failure information sent by the terminal device, wherein the SCG failure information comprises the first RLF type indication information;
wherein the primary carrier is a primary carrier in a Secondary Cell Group (SCG), and the secondary carrier is a secondary carrier in the SCG.

7. The method according to claim 6, wherein the first RLF type indication information is used to indicate that the carrier where the RLF event occurs is a secondary carrier in the SCG.

8. The method according to claim 7, wherein the method further comprises:
receiving, by the network device, the second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs; and
determining, by the network device, that the carrier where the RLF event occurs is the primary carrier in the SCG according to the second RLF type indication information.

9. The method according to claim 7, further comprising:
determining, by the network device, that the RLF event occurs in a target carrier, and sending Radio Resource Control (RRC) reconfiguration information to the terminal device, wherein the RRC reconfiguration information is used to perform RRC connection reconfiguration between the terminal device and the network device, and the target carrier is a secondary carrier in a Master Cell Group (MCG), a primary carrier in the SCG or a secondary carrier in the SCG.

10. The method according to claim 7, further comprising:
determining, by the network device, that the RLF event occurs in the primary carrier in a Master Cell Group (MCG), and sending RRC re-establishment information to the terminal device, wherein the RRC re-establishment information is configured to perform RRC re-establishment between the terminal device and the network device.

11. A terminal device, comprising:
a processor;
a non-transitory memory storing instructions executable by the processor;
a transceiver;
wherein the transceiver is configured to send same Packet Data Convergence Protocol (PDCP) layer data to a network device using a primary carrier and a secondary carrier;
wherein the processor is configured to, if a number of transmissions of Acknowledged Mode Protocol Data Unit (AMD PDU) reaches a maximum number of transmissions in a Radio Link Control (RLC) entity corresponding to the secondary carrier, determine that a Radio Link Failure (RLF) event occurs in the secondary carrier; and
wherein the transceiver is configured to send the first RLF type indication information to the network device, wherein the first RLF type indication information is used to indicate that a carrier where the RLF event occurs is the secondary carrier;
wherein the transceiver is configured to:
send Secondary Cell Group (SCG) failure information to the network device, wherein the SCG failure information comprises the first RLF type indication information;
wherein the primary carrier is a primary carrier in a Secondary Cell Group (SCG), and the secondary carrier is a secondary carrier in the SCG.

12. The terminal device according to claim 11, wherein the first RLF type indication information is used to indicate that the carrier where the RLF event occurs is a secondary carrier in the SCG.

13. The terminal device according to claim 12, wherein the processor is configured to:
  if the number of transmissions of the AMD PDU reaches the maximum number of transmissions in the RLC entity corresponding to the primary carrier in the SCG, determine that the RLF event occurs in the primary carrier in the SCG; and
  wherein the transceiver is configured to send the second RLF type indication information to the network device, wherein the second RLF type indication information is used to indicate that the carrier where the RLF event occurs is the primary carrier in the SCG.

14. The terminal device according to claim 12, wherein the processor is further configured to:
  if it is determined that the number of transmissions of the AMD PDU reaches the maximum number of transmissions in the RLC entity corresponding to a target carrier, determine that the RLF event occurs in the target carrier;
  wherein the transceiver is configured to send Radio Resource Control (RRC) reconfiguration information to the network device, the RRC reconfiguration information is used to perform RRC connection reconfiguration between the terminal device and the network device, and the target carrier is a secondary carrier in a Master Cell Group (MCG), a primary carrier in the SCG or a secondary carrier in the SCG.

15. The terminal device according to claim 12, wherein the processor is configured to:
  if it is determined that the number of transmissions of the AMD PDU reaches the maximum number of transmissions in the RLC entity corresponding to the primary carrier in a Master Cell Group (MCG), determine that the RLF event occurs in the primary carrier in the MCG;
  wherein the transceiver is configured to send an RRC re-establishment request message to the network device, and the RRC re-establishment request message is configured to request RRC re-establishment with the network device.

16. A network device, comprising:
  a processor;
  a non-transitory memory storing instructions executable by the processor;
  a transceiver;
  wherein the transceiver is configured to receive same Packet Data Convergence Protocol (PDCP) layer data which is sent by a terminal device using a primary carrier and a secondary carrier;
  wherein the transceiver is configured to receive first RLF type indication information sent by the terminal device, wherein the first RLF type indication information is used to indicate that a carrier where a Radio Link Failure (RLF) event occurs is the secondary carrier, and a number of transmissions of Acknowledged Mode Protocol Data Unit (AMD PDU) reaches a maximum number of transmissions in a Radio Link Control (RLC) entity corresponding to the secondary carrier where the RLF event occurs; and
  wherein the processor is configured to determine that the carrier where the RLF event occurs is the secondary carrier according to the first RLF type indication information;
  wherein the transceiver is configured to:
  receive Secondary Cell Group (SCG) failure information sent by the terminal device, wherein the SCG failure information comprises the first RLF type indication information;
  wherein the primary carrier is a primary carrier in a Secondary Cell Group (SCG), and the secondary carrier is a secondary carrier in the SCG.

17. The network device according to claim 16, wherein the first RLF type indication information is used to indicate that the carrier where the RLF event occurs is a secondary carrier in the SCG.

18. The network device according to claim 17, wherein the transceiver is configured to:
  receive the second RLF type indication information sent by the terminal device, wherein the second RLF type indication information is used to indicate that the carrier where the RLF event occurs is the primary carrier in the SCG, and the number of transmissions of the AMD PDU reaches the maximum number of transmissions in the RLC entity corresponding to the primary carrier in the SCG where the RLF event occurs; and
  wherein the processor is configured to determine that the carrier where the RLF event occurs is the primary carrier in the SCG according to the second RLF type indication information.

19. The network device according to claim 17, wherein the transceiver is further configured to:
  if the processor determines that the RLF event occurs in a target carrier, send Radio Resource Control (RRC) reconfiguration information to the terminal device, wherein the RRC reconfiguration information is used to perform RRC connection reconfiguration between the terminal device and the network device, and the target carrier is a secondary carrier in a Master Cell Group (MCG), a primary carrier in the SCG or a secondary carrier in the SCG.

20. The network device according to claim 17, wherein the transceiver is further configured to:
  if the processor determines that the RLF event occurs in the primary carrier in a Master Cell Group (MCG), send RRC re-establishment information to the terminal device, wherein the RRC re-establishment information is configured to perform RRC re-establishment between the terminal device and the network device.

* * * * *